United States Patent [19]

Matsubayashi

[11] Patent Number: 5,099,470
[45] Date of Patent: Mar. 24, 1992

[54] APPARATUS FOR REPRODUCING INFORMATION FROM OPTO-MAGNETIC RECORD MEDIUM

[75] Inventor: Nobuhide Matsubayashi, Hachioji, Japan

[73] Assignee: Olympus Optical Co., Ltd., Tokyo, Japan

[21] Appl. No.: 483,016

[22] Filed: Feb. 22, 1990

[30] Foreign Application Priority Data

Feb. 28, 1989 [JP] Japan ............................. 1-45185

[51] Int. Cl.$^5$ .............................................. G11B 7/00
[52] U.S. Cl. ........................................ 369/110; 369/13; 369/112; 360/114
[58] Field of Search ............... 369/110, 112, 44.23, 369/13, 109, 44.37, 100; 360/114; 250/201.1, 201.5; 350/286, 169, 171, 6.4

[56] References Cited

U.S. PATENT DOCUMENTS

| | | | |
|---|---|---|---|
| 4,682,311 | 7/1987 | Matsubayashi et al. | 369/112 |
| 4,774,615 | 9/1988 | Revelli et al. | 369/110 |
| 4,785,438 | 11/1988 | Mizunoe | 369/110 |
| 4,905,215 | 2/1990 | Hattori et al. | 369/110 |
| 4,951,274 | 8/1990 | Iwanaga et al. | 369/110 |
| 4,985,880 | 1/1991 | Yoshida et al. | 369/110 |

OTHER PUBLICATIONS

P. Wolniansky, et al., "Magneto-optical measurements of hysteresis loop and anistrophy energy constants on amorphous $Tb_xFe_{1-x}$ alloys", J. Appl. Physics, vol. 60, No. 1, Jul. 1986.

Primary Examiner—Roy N. Envall, Jr.
Assistant Examiner—Thang V. Tran
Attorney, Agent, or Firm—Stevens, Davis, Miller & Mosher

[57] ABSTRACT

In an apparatus for reproducing information recorded in an opto-magnetic record medium, a linearly polarized light beam is made incident upon the record medium, a light beam reflected by the record medium is made incident upon a quarter wavelength plate whose principal axis is inclined with respect to the polarization direction of the incident linearly polarized light beam and is converted into one of elliptically polarized light beams having major axes perpendicular to each other depending upon the direction of magnetization in the record medium. The elliptically polarized light beam is made incident upon a polarization beam splitter for separating major and minor axis components from each other, and the thus separated major and minor axis components are received by first and second photodetectors, respectively. Output signals from the photodetectors are supplied to a differential amplifier to drive a difference therebetween representing a reproduced information signal. The information signal having a high C/N ratio can be reproduced without being influenced by a phase difference caused by the optomagnetic record medium and/or optical elements constituting of an optical system of the apparatus.

9 Claims, 9 Drawing Sheets

FIG_1 PRIOR ART

FIG_8

FIG_9A

FIG_9B

FIG_9C

FIG_10

FIG_11

FIG_14

APPARATUS FOR REPRODUCING INFORMATION FROM OPTO-MAGNETIC RECORD MEDIUM

BACKGROUND OF THE INVENTION

Field of the Invention and Related Art Statement

The present invention relates to an apparatus for reproducing information from a magneto-optic record medium in which the information has been recorded by magnetizing a recording layer thereof in a direction perpendicular to a plane of the recording layer.

Figure 1:
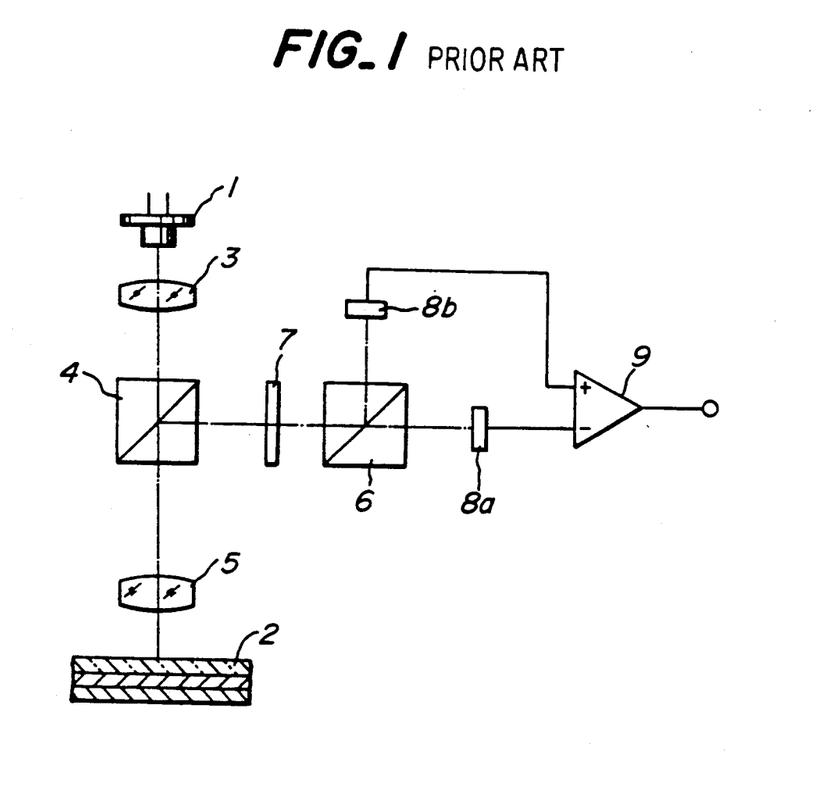
FIG. 1 is a schematic view showing a conventional apparatus for reproducing information from the a magneto-optic recording medium.

Hitherto, several kinds of apparatuses for reading out information from magneto-optic information record medium have been suggested. For instance, in Japanese Laid Open Patent Publication No. 63-184936, a known apparatus for reproducing information from a magneto-optic record medium is disclosed and the construction thereof is shown in FIG. 1. In this known apparatus, a laser beam is generated by a semiconductor laser 1 and is projected on a magneto-optic information record medium 2 via a collimater lens 3, a beam splitter 4 and an objective lens 5. A laser beam reflected by the record medium 2 is made incident upon a polarization beam splitter 6 via the objective lens 5, the beam splitter 4 and a half wavelength plate 7. The light beam is separated into a transmission light beam and a reflection light beam by the polarization beam splitter 6. And the transmission and reflection light beams are detected by first and second photodetectors 8a and 8b, respectively, and outputs of the first and second photo detectors 8a and 8b are supplied to a differential amplifier 9 to obtain a signal representing the information recorded in the optomagnetic record medium 2 by detecting a difference between the outputs of the photodetectors 8a and 8b.

Figure 2A:
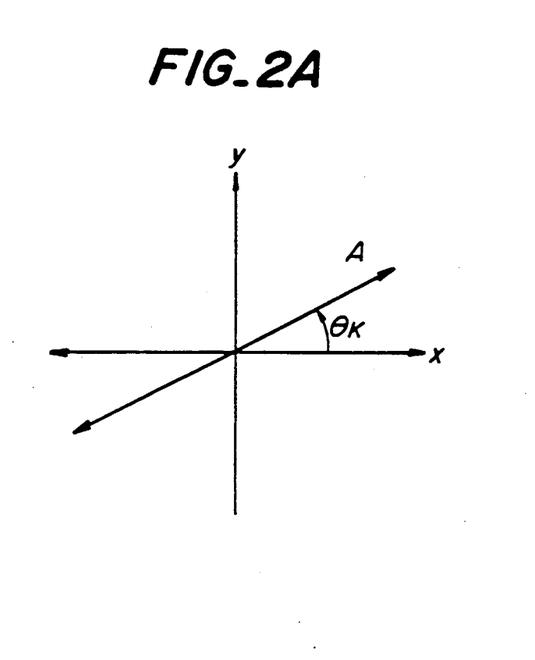
FIGS. 2A and 2B are schematic views depicting the rotational angle of the polarization plane of the incident light beam rotated by the Kerr effect.

In this known apparatus, when a linearly polarized light beam, whose polarizing direction is represented by an x axis in FIG. 2A, is made incident upon the record medium 2, a plane of polarization of the reflection light beam reflected by the record medium 2 is rotated by $\theta_K$ by the Kerr effect. In principle, the reflection light beam reflected by the record medium 2 is also linearly polarized light beam. The direction of the linearly polarized light beam reflected by the record medium 2 is represented by a line A in FIG. 2A.

Figure 2B:
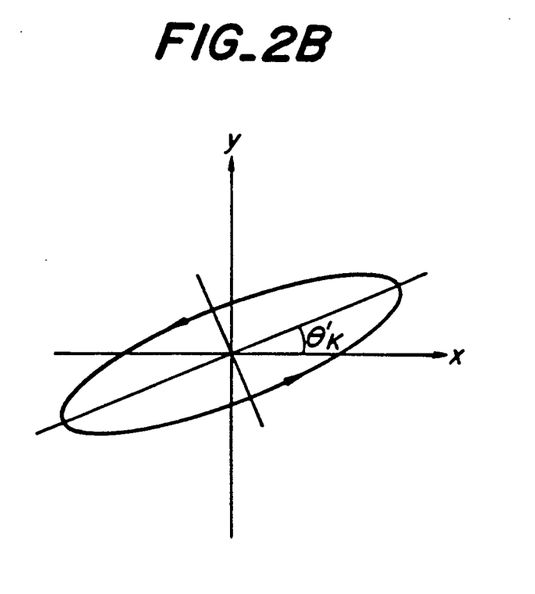
Figure 3:
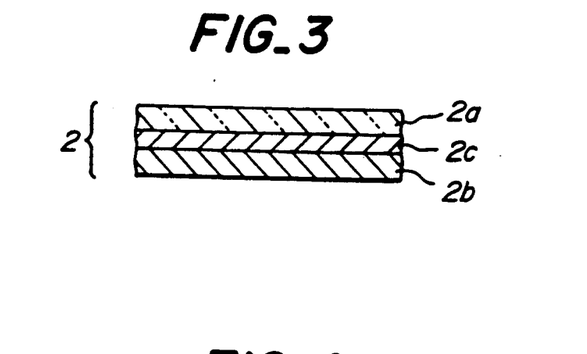
FIG. 3 is a cross sectional view illustrating a magneto-optic record medium.

However, the record medium 2 is generally formed to have a multiple layer construction as shown in FIG. 3 in order to increase the recording ability thereof. The record medium 2 is constructed such that a dielectric layer 2c is provided between a transparent substrate 2a and a magnetic film 2b which serves as an information recording layer. When the incident linearly polarized light beam is made incident upon the record medium 2 having such multi-layer construction, there is generated a phase difference between a component of the light beam reflected by the record medium in the polarization direction of the incident linearly polarized light beam and a component in a direction perpendicular to the polarization direction of the incident linearly polarized light due to a characteristic of the magnetic film 2b per se and optical characteristics of the other layers constituting the record medium 2. Therefore, the linearly polarized incident light beam is often converted into an elliptically polarized light beam as shown in FIG. 2B when being reflected by the record medium 2. In this case, the rotational angle of the polarized plane of the incident light beam rotated by the Kerr effect is determined by an angle between the major axis of the elliptically polarized light beam and the direction of the incident linearly polarized light beam, so that the rotational angle $\theta_K'$ is substantially decreased as shown in FIG. 2B in comparison with the angle $\theta_K$ of FIG. 2A. And therefore, a strength of the signal (C/N ratio) detected by the differential amplifier 9 is decreased. When the phase difference introduced by the multi-layer construction of the record medium is represented by $\delta$, the decrease of the C/N ratio is proportional to cos $\delta$. The decrease of C/N ratio is caused by similar phase differences of the optical elements provided in the information reproducing apparatus such as the beam splitter and mirror (not shown in FIG. 1).

Figure 4:
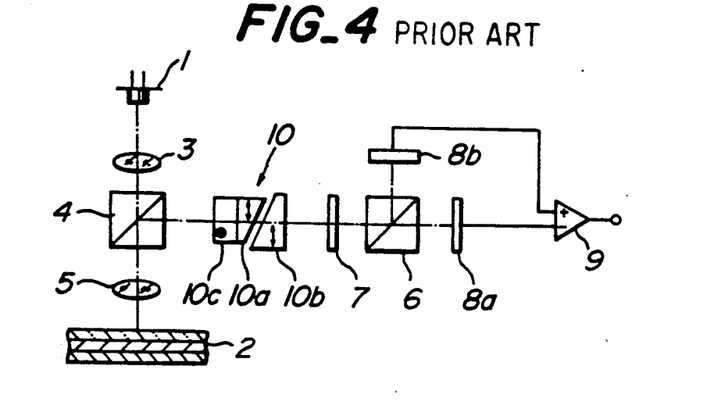
FIG. 4 is a schematic view representing the improvement of the conventional apparatus shown in FIG. 1.

In order to compensate for the above mentioned phase differences, there has been suggested to arrange a Babinet compensator 10 between the beam splitter 4 and the half wavelength plate 7 as shown in FIG. 4. The Babinet compensator 10 comprises a pair of wedge-shaped dextrorotatory crystals 10a, 10b and a laevorotatory crystal 10c which is adhered to one of the wedge-shaped dextrorotatory crystals 10a such that the optical axis of the crystal 10c is perpendicular to that of the crystals 10a and 10b. It should be noted that the optical axis of the dextrorotatory crystal 10a is represented by a mark ] and the optical axis of the laevorotatory crystal by a mark ⊕ in FIG. 4. The phase difference caused by the opto-magnetic record medium 2 and/or the optical elements constituting the optical system of the information reproducing apparatus can be compensated for by moving the wedge-shaped dextrorotatory crystal 10b by means of a micrometer. Thus, it is possible to convert the elliptically polarized light beam into a linearly polarized light beam. Therefore, when the Babinet compensator 10 is arranged between the beam splitter 4 and the half wavelength plate 7, the Kerr rotation angle does not decreased so much that the signal having a high C/N ratio can be obtained. However, the Babinet compensator 11 is so expensive and has very complexed construction as stated above. Further, in order to compensate for the phase differences accurately, it is necessary to adjust the compensator in a precise manner and this requires time consuming and cumbersome operation. Therefore, it is practically difficult to use the Babinet compensator.

SUMMARY OF THE INVENTION

The present invention has for its object to provide an apparatus for reproducing information from a magneto-optic record medium, in which a signal representing the information having a high C/N ratio can be obtained without a complex optical system and an expensive optical element such as Babinet compensator.

In order to carry out this object, the apparatus according to the invention comprises:

light source means for emitting a linearly polarized light beam;

incident means for making the linearly polarized light beam incident upon a magneto-optic record medium in which information is recorded as vertical magnetization;

first optical means for converting the reflection light beam reflected by said record medium into one of two elliptically polarized light beams, major axes of the elliptically polarized light beams being perpendicular to each other;

second optical means for separating the elliptically polarized light beam emanating from said first optical means into a major axis component and a minor axis component;

light receiving means for receiving said major and minor axis components of the elliptically polarized light beam and for generating electric signals which represent the major and minor axis components of the elliptically polarized light beam, respectively; and signal generating means for generating a signal representing the information recorded in the record medium by detecting a difference between said electric signals generated by said light receiving means.

Under a given polarized condition, when an amplitude of an x direction component of polarized light is represented by $E_X$, and an amplitude of a y direction component, which is perpendicular to the x direction, is represented by $E_Y$, and a phase difference is represented by $\delta$, Stokes parameters are as follows:

$$\left. \begin{array}{l} S_0 = <|E_X|^2> + <|E_Y|^2> \\ S_1 = <|E_X|^2> - <|E_Y|^2> \\ S_2 = <2E_X E_Y \cos \delta> \\ S_3 = <2E_X E_Y \sin \delta> \end{array} \right\} \quad (1)$$

wherein $S_0$ represents strength, $S_1$ horizontal linearly polarized light component, $S_2$ 45 degrees linearly polarized light component, and $S_3$ right-handed circularly polarized light component. It should be noted that $\delta$ is equal to a difference between instantaneous scalar components $A_X$ and $A_Y$ having phases $\delta_X$ and $\delta_Y$ ($\delta = A_X - A_Y$). From the equations mentioned in the above, the following relationship can be obtained:

$$S_0^2 = S_1^2 + S_2^2 + S_3^2 \quad (2)$$

Figure 5:
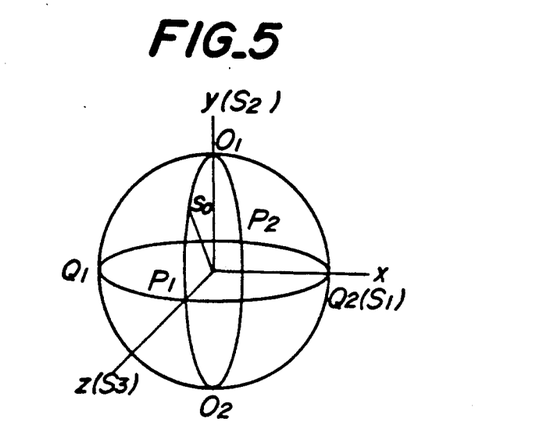
FIG. 5 is a schematic view showing Poincaré sphere.

In the space coordinates, when the horizontal linearly polarized light component $S_1$ is positioned in x axis, the 45 degrees linearly polarized light component $S_2$ in y axis, and the right-handed circularly polarized light component $S_3$ in z axis, coordinates of $S_1$, $S_2$ and $S_3$ for representing the polarized condition are positioned on a surface of Poincaré sphere shown in FIG. 5. The radius of the sphere is determined by the strength $S_0$.

When a major axis component and a minor axis component of elliptically polarized light are a and b, respectively, the ellipticity angle $\beta$ is determined by the following formula:

$$\beta = \tan^{-1} a/b (-45° \leq \beta \leq 45°).$$

When an azimuth angle of the major axis is $\theta$ ($-90° \leq \theta \leq 90°$), the horizontal linearly polarized light component $S_1$, the 45° linearly polarized light component $S_2$ and the right-handed circularly polarized light component $S_3$ of the above mentioned Stokes parameters become:

$$\left. \begin{array}{l} S_1 = S_0 \cos 2\beta \cos 2\theta \\ S_2 = S_0 \cos 2\beta \sin 2\theta \\ S_3 = S_0 \sin 2\beta \end{array} \right\} \quad (3)$$

In the Poincaré sphere shown in FIG. 5, when the latitude is $L_A$ and the longitude is $L_O$, the following equations are obtained.

$$\left. \begin{array}{l} L_A = 2\beta \\ L_O = 2\theta \end{array} \right\} \quad (4)$$

Figure 6A:
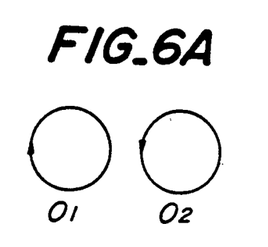
FIGS. 6A to 6C are schematic views depicting polarized light beams represented by points on the surface of the Poincaré sphere shown in FIG. 5.
Figure 6B:
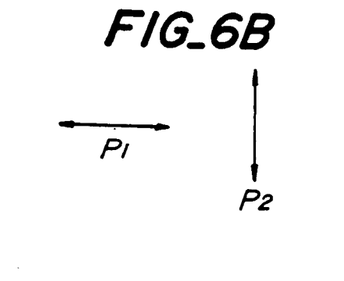
Figure 6C:
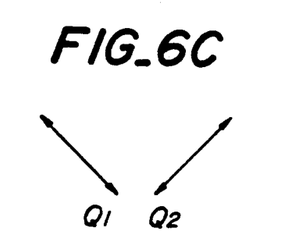

That is to say, the latitude $L_A$ becomes twice of the ellipticity angle $\beta$ of the elliptically polarized light and the longitude becomes twice of the azimuth angle of the major axis thereof. It should be noted that a point $O_1$ in FIG. 5 corresponds to a right-handed circularly polarized light, point $O_2$ a left-handed circularly polarized light, point $P_1$ an x direction linearly polarized light, point $P_2$ a y direction linearly polarized light, point $Q_1$ a linearly polarized light having an azimuth angle of 45°, and point $Q_2$ a linearly polarized light having an azimuth angle of $-45°$, and these polarized light beams are schematically illustrated in FIGS. 6A to 6C.

Figure 7A:
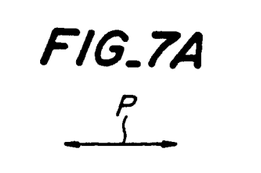
FIGS. 7A through 7C are schematic views illustrating the light beams in case that the linearly polarized light beams are reflected by the magneto-optic record medium.
Figure 7B:
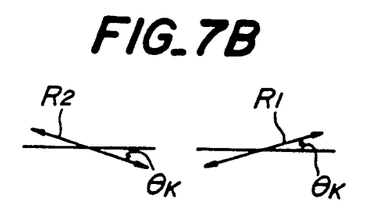
Figure 7C:
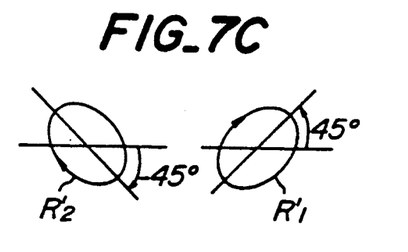
Figure 8:
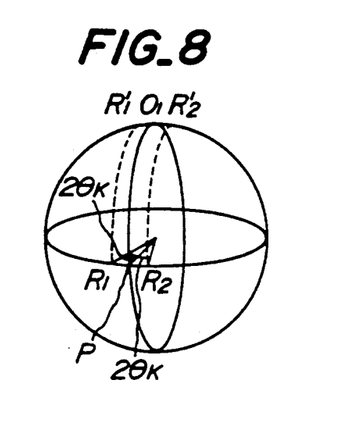
FIG. 8 is a schematic view representing the Poincaré sphere on the surface of which the linearly polarized light beams illustrated in FIGS. 7A to 7C are plotted.

When a linearly polarized light beam P shown in FIG. 7A is made incident upon an a magneto-optic record medium, a reflection light beam $R_1$ having a polarization direction rotated by $\theta_K$ or a reflection light $R_2$ having a polarization direction rotated by $-\theta_K$ can be obtained as shown in FIG. 7B depending upon the magnetization direction of the recording layer of the record medium. On the surface of Poincaré sphere, the reflection light beams $R_1$ and $R_2$ are positioned on the equator of the sphere and the latitudes thereof are rotated by $\pm 2\theta_K$ with respect to the reference point $P_1$ as illustrated in FIG. 8. When the reflection light beams are made incident upon a quarter wavelength plate having its azimuth angle of 45 degrees and phase difference of 90 degrees, the reference point P is converted to the point $O_1$ and the points $R_1$ and $R_2$ are converted to points $R_1'$ and $R_2'$ on the Poncaré sphere, respectively. Since the quarter wavelength plate serves to change linear polarized light having its azimuth angle of zero degree into a right handed circularly polarized light. That is to say, after the incident linearly polarized light beam passes through the quarter wavelength plate, an elliptically polarized light beam $R_1'$ in which the azimuth angle of the major axis is inclined by 45 degrees with respect to the polarization direction of the incident linearly polarized light beam or an elliptically polarized light beam $R_2'$ in which the azimuth angle of the major axis is inclined by $-45$ degrees with respect to the polarization direction of the incident linearly polarized light beam can be obtained. It should be noted that the lengths of the major and minor axes of the elliptically polarized light beam are the same, and the major axes of the elliptically polarized light beam are perpendicular to each other.

Figure 9A:
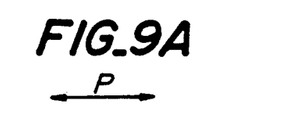
FIGS. 9A to 9C are schematic views showing the light beams in case the elliptically polarized light beams are reflected by the record medium.
Figure 9B:
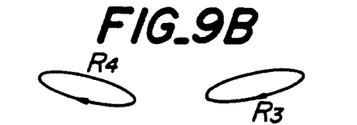
Figure 9C:
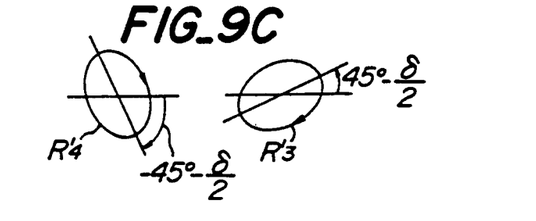
Figure 10:
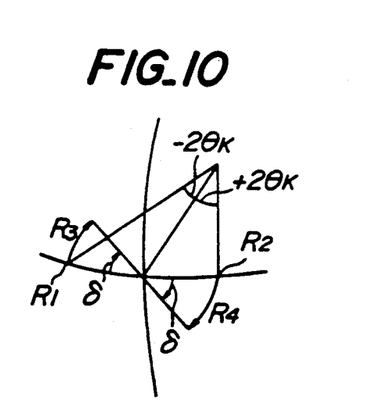
FIG. 10 is a schematic view depicting a part of the Poincaré on the surface of which the elliptically polarized light beams shown in FIGS. 9A to 9C are plotted.
Figure 11:
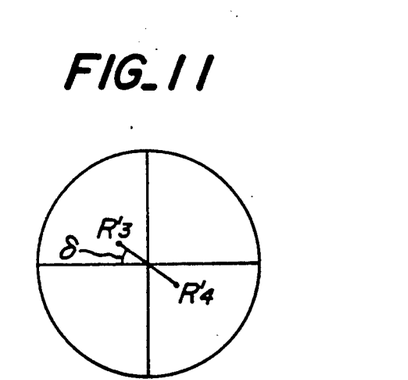
FIG. 11 is a schematic view illustrating the Poincaré sphere viewed from an upper direction.
Figure 12:
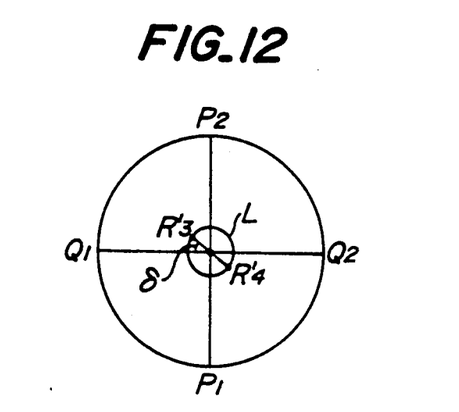
FIG. 12 is a schematic view representing the Poincaré sphere viewed from an upper direction and showing the relationship between the phase difference and the elliptically polarized light beams.
Figure 13:
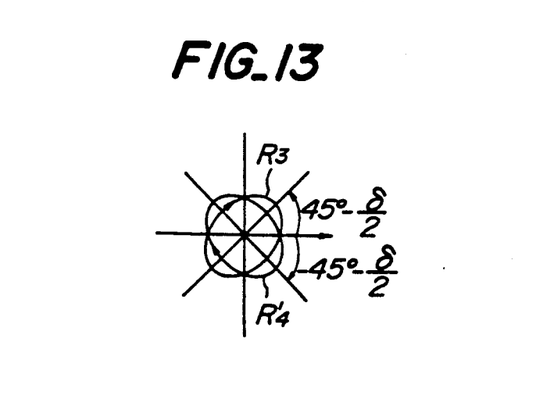
FIG. 13 is a schematic view showing the elliptically polarized light beams after passing through the quarter wavelength plate.

In case the phase difference $\delta$ is caused by the magneto-optic record medium and/or the optical elements constituting the optical system of the information reproducing apparatus, the elliptically polarized light beams $R_3$, $R_4$ shown in FIG. 9B are obtained when the incident linearly polarized light P(FIG. 9A) is reflected by the record medium and/or when the incident light beam passes through the optical elements. On the surface of the Poincaré sphere, the elliptically polarized light beams $R_3$ and $R_4$ are positioned at points which are rotated by $\pm\delta$ from the points $R_1$ and $R_2$ with respect to the reference point $P_1$, as shown in FIG. 10. And, when the elliptically polarized light beams pass through the quarter wavelength plate, the elliptically polarized light beams $R_3$ and $R_4$ are converted into points $R_3'$ and $R_4'$ on the Poincaré sphere. The latitudes of $R_3'$ and $R_4'$ are deviated from the reference point P by $\pm\delta$ but the longitudes are the same as those of the elliptically polarized light beams $R_1'$ and $R_2'$. FIG. 11 is a schematic view showing the Poincaré sphere viewed from the $S_2(y)$ axis direction. The positions of $R_1'$ and $R_2'$ on the surface of Poincaré sphere mean that the ellipticities of these pairs of elliptically polarized light beams $R_1'$, $R_2'$ and $R_3'$, $R_4'$ are the same and the azimuth directions thereof are inclined by $\delta/2$ with respect to each other. That is to say, even when the phase difference is caused by the magneto-optic record medium and/or the optical elements of the apparatus, the elliptically polarized light beams $R_3'$, $R_4'$ always exist at the positions faced to each other with respect to the point $O_1$ and on a circle L having a center at the point $O_1$ and having a radius determined by the azimuth angle $\theta_K$ on the Poincaré sphere by arranging the quater wavelength plate such that the principle axis thereof is inclined by 45 degrees with respect to the polarization direction of the incident linearly polarized light beam. In other words, there are produced elliptically polarized light beams whose ellipticities are the same, whose major axes are perpendicular to each other, and the directions of whose major axes are deviated from the polarized direction of the incident linearly polarized light beam by $45° - \delta/2$, and $-(45° + \delta/2)$ as shown in FIG. 13. Therefore, when the directions of the P-polarization and S polarization of the polarization beam splitter are made coincident with the directions of the major and minor axes of the elliptically polarized light beam, respectively, and the difference between the transmitting light beam and the reflecting light beam emanating from the polarization beam splitter is detected, it is possible to obtain a signal having a high C/N for reproducing the information recorded in the opto-magnetic recording medium without being influenced by the phase difference $\delta$ caused by the opto-magnetic record medium and/or the optical elements of the apparatus.

DETAILED DESCRIPTION OF THE PREFERRED EMBODIMENTS

Figure 14:
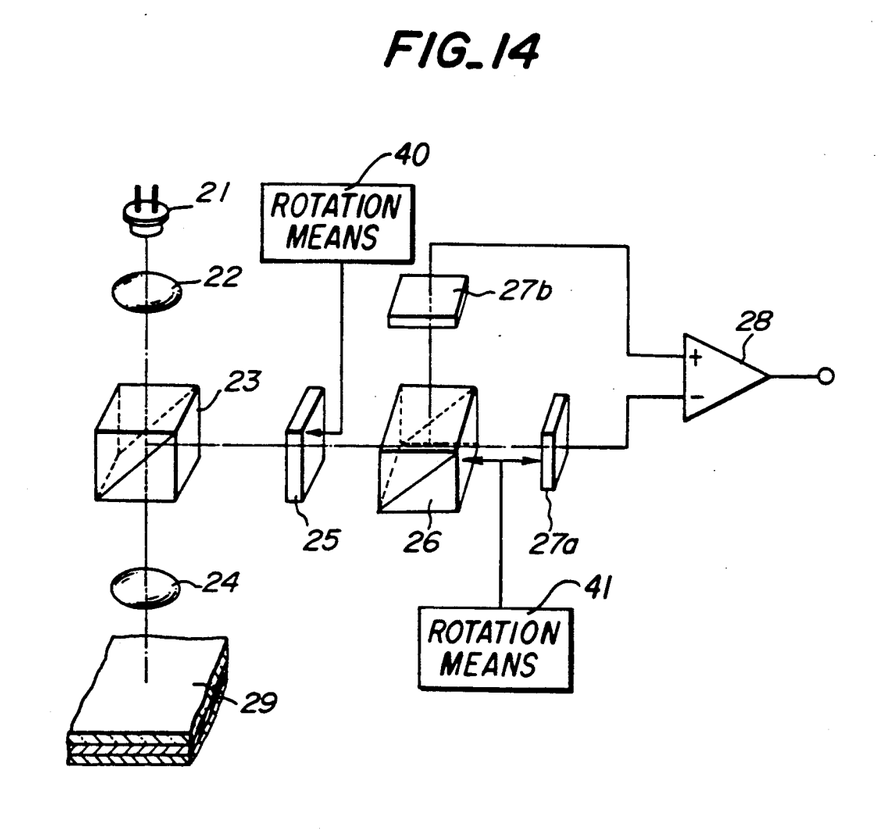
FIG. 14 is a schematic view depicting the construction of the apparatus according to a first embodiment of the invention.

FIG. 14 is a schematic view showing the apparatus for reproducing information from an opto-magnetic record medium according to a first embodiment of the invention. In this embodiment, the apparatus comprises a light emitting means including a semi-conductor laser 21; a light converging means having a collimater lens 22; a beam splitter 23 and an objective lens 24; a first optical means including a quarter wavelength plate 25; a second optical means having a polarization beam splitter 26; a light receiving means comprising photodetectors 27a and 27b; and a signal generating means comprising a differential amplifier 28. A linearly polarized light beam generated from the semiconductor laser 21 is made incident upon a magneto-optic record medium 29 via the collimator lens 22, the beam splitter 23 and the objective lens 24. A reflection light beam reflected by the record medium 29 is made incident upon the polarized beam splitter 26 via the objective lens 24, the beam splitter 23 and the quarter wavelength plate 25. The polarized beam splitter 26 serves to separate the light beam into a transmission light beam and a reflection light beam, and these transmission and reflection light beams are detected by the photodetectors 27a and 27b, respectively. The outputs of the photodetectors 27a and 27b are supplied to the differential amplifier 28. In the differential amplifier 28, the difference between the outputs of the photodetectors 27a and 27b is derived to produce a signal representing the information recorded in the record medium 29. A rotation means 40 rotates quarter wavelength plate 25 such that the principal axis thereof is rotated by 45° or −45° with respect to a polarization direction of the linearly polarized light beam incident upon the record medium 29. A rotation means 40 rotates polarized beam splitter 26 to be rotatable about an optical axis of the incident light beam.

Further, the photodetector 27b which receives the reflection light beam reflected by the polarization beam splitter 26 is rotatable by rotation means 41 in conjunction with the rotation of the polarization beams splitter 26 in order to receive the reflection light beam in an effective manner.

Figure 15A:
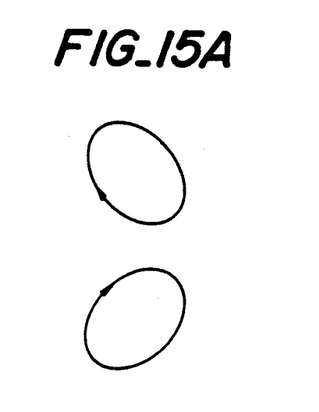
FIGS. 15A to 15C are schematic views illustrating polarized light beams produced in the apparatus of the invention depicted in FIG. 14.
Figure 15B:
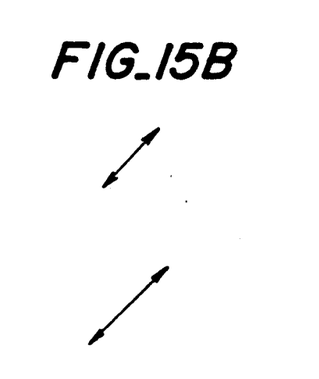
Figure 15C:
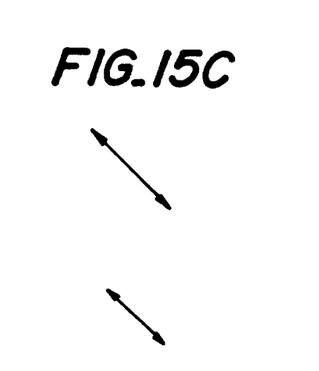

In such construction as described, when the light beam reflected by the recording medium 29 passes through the quarter wavelength plate 25, one of elliptically polarized light beams is obtained depending upon the magnetization direction in record medium 29. The polarization direction of the elliptically polarized light beams are represented by ellipses shown in FIG. 15A. As is clear from FIG. 15A, the major axis directions of these ellipses are perpendicular to each other. The polarization beam splitter 26 is rotated by rotation means 41 about the optical axis of the incident light of the beam splitter 26 such that all of the major axis direction components of the elliptically polarized incident light beam are transmitted and all of the minor axis direction components are reflected, and the photodetector 27b for receiving the reflection light from the beam splitter 26 is rotatably arranged so as to effectively receive the reflection light, i.e. the minor axis direction component of the reflection light. It may be possible to arrange the polarization beam splitter 26 such that all of the minor axis direction components of the elliptically polarized incident light beam are transmitted and all of the major axis direction components are reflected. By arranging the polarization beam splitter 26 in the manner explained above, the amplitude of the reproduced information signal obtained from the differential amplifier 28 becomes maximum. FIGS. 15B and 15C are schematic views showing the transmission and reflection light beams transmitted through and reflected by the polarization beams splitter 26. As apparent from FIGS. 15B and 15C, the intensities of the light beams incident upon the photodetectors 27a and 27b are changed in an opposite phase depending upon the magnetizing direction of the record medium 29 although the mean light amounts of the light beams are the same regardless of the magnetizing direction. Therefore, it is possible to obtain the information signal having a high C/N ratio from the differential amplifier 28 for detecting the difference between the outputs of the photodetectors 27a and 27b without being influenced by the phase difference caused by the recording medium 29 and/or the optical elements such as the beam splitter 23, etc.

Figure 16:
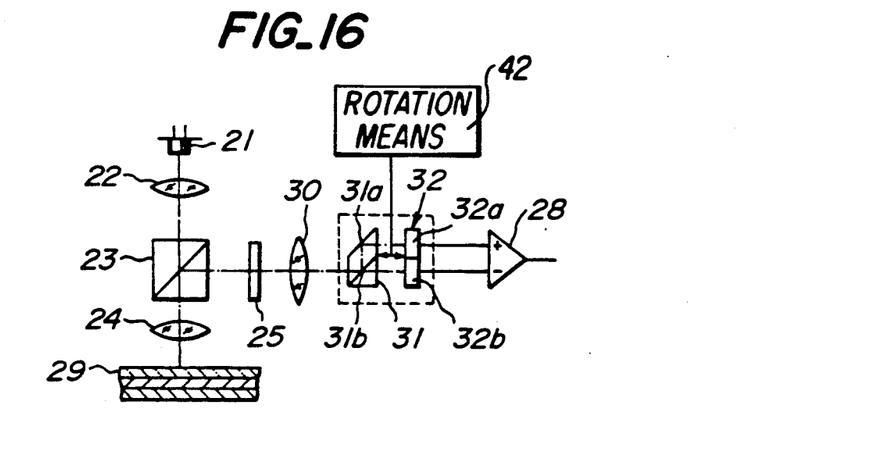
FIG. 16 is a schematic view representing the construction of the apparatus according to a second embodiment of the invention.

FIG. 16 is a schematic view illustrating the apparatus for reproducing information from a magneto-optic record medium according to a second embodiment of the invention. In this embodiment, a convergence lens 30 is arranged between the quarter wavelength plate 25 and a polarization beam splitter 31, so that the reflection light beam reflected from record medium 29 is converged by the convergence lens 30 after passing through the quarter wavelength plate 25, and is thereafter made incident upon the polarization beam splitter 31. In this embodiment, a surface 31a which is arranged to be parallel with the polarization surface 31b of the polarization beam splitter 31 is formed as a mirror in order to reflect the reflection light reflected by the polarization surface 31b into almost the same direction as that of the transmission light beam transmitted through the polarization surface 31b. The reflection and transmission light beams emanating from the polarization beam splitter 31 are detected by a photodetector 32 which comprises a pair of light receiving areas 32a and 32b arranged in the same plane. The outputs of the photodetector 32 are supplied to the differential amplifier 28 to derive a difference therebetween as the reproduced information signal. Rotation means 42 rotates beam splitter 31 and photodetector 32 integrally about the optical axis of the incident light beam so as to effectively separate the major axis direction component and the minor axis direction component of the elliptically polarized incident light beam from the quarter wavelength plate 25 from each other and to effectively receive the major and minor axis direction components by the light receiving areas 32a and 32b of the photodetector 32. The other construction of the apparatus is the same as that of the apparatus of the first embodiment. Also, in the second embodiment, the information signal having a high C/N ratio can be obtained without being influenced by the phase difference of the record medium and/or optical elements.

Figure 17:
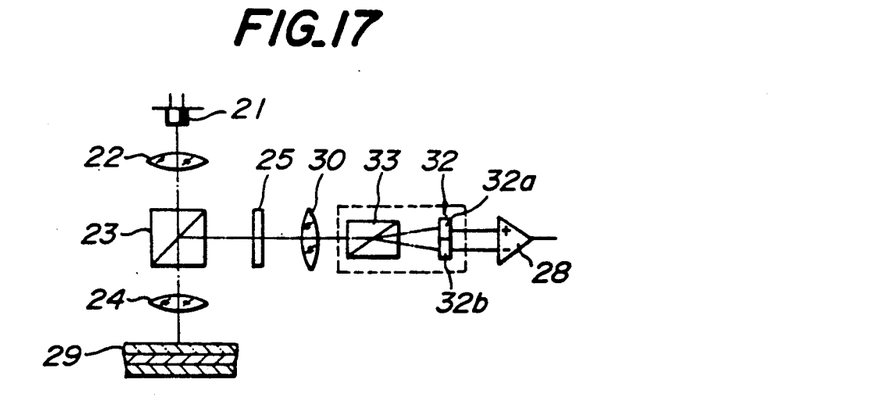
FIG. 17 is a schematic view showing the construction of the apparatus according to a third embodiment of the invention.

FIG. 17 is a schematic view representing the apparatus according to a third embodiment of the invention. In this embodiment, a Wollaston prism 33 is used for separating the major and minor axis direction components of the elliptically polarized light beam from each other. That is to say, the major and minor axis direction components of the elliptically polarized light beam emanating from the quarter wavelength plate 27 are separated by the Wollaston prism 33 and are detected by the light receiving areas 32a and 32b of the photodetector 32 which are arranged in the same plane. The Wollaston prism 33 and the photodetector 32 are arranged to be integrally rotated about the optical axis of the incident light beam upon the Wollaston prism 33 in order to separate the major and minor axis components in an effective manner.

In the embodiments mentioned in the above, the quarter wavelength plate 25 is used for obtaining the elliptically polarized light beams, but an optical element having a phase difference of 90° such as a total internal reflection prism may be substituted for the quarter wavelength plate 25. In this case, the elliptically polarized light beams can be obtained with the aid of the phase difference which is caused by the optical element such as a total internal reflection prism.

As stated above, according to the invention, it is always possible to reproduce the information signal having a high C/N ratio without using the Babinet compensator, i.e. without making the construction complex and the cost high. As described before, the C/N ratio is proportional to cos δ. Thus, in case the phase difference of 30° is caused by the information record medium and/or the optical elements constituting the optical system of the apparatus, the C/N is decreased by about −1.2 dB because cos 30° is about 0.87. And in case of the phase difference of 45°, the C/N is decreased by about −3 dB. According to the invention, it is possible to remove the influence of the phase difference δ and to make the decrement of C/N zero. The azimuth rotational angle of the second optical element constituted by the beam splitter or the Wollaston prism is determined depending upon particular phase differences. That is to say, when the phase difference is δ, the second optical element has to be set at an azimuth angle of 45°+δ/2 with respect to the linearly polarized light beam incident upon the record medium. In other words, by measuring the most preferable azimuth angle of the second optical element, it is possible to detect the phase difference of the optical system of the whole apparatus including the record medium. Therefore, the phase difference of the information record medium can be measured from the most preferable azimuth angle of the second optical element by preliminarily measuring the phase difference of the optical system of the apparatus. And, it is also possible to measure the phase difference of the optical system by using the information record medium whose phase difference has been known.

What is claimed is:

1. An apparatus for reproducing information from a magneto-optic record medium comprising:
   (a) light source means for emitting a linearly polarized light beam;
   (b) light incident means for making the linearly polarized light beam incident upon a magneto-optic record medium having information recorded thereon in a vertical magnetization mode;
   (c) first optical means for converting a reflection light beam which is reflected by said record medium into elliptically polarized light beams, wherein a polarization condition of said first optical means is varied depending upon a direction of the vertical magnetization mode of the recorded information to enable said first optical means to convert said reflection light beam into one of said elliptically polarized light beams having major axes which are perpendicular to each other
   (d) second optical means for separating the elliptically polarized light beam emanating from said first optical means into a major axis component and a minor axis component;
   (e) rotation means for rotating said second optical means about a rotation axis extending along an optical axis direction of light traveling between said first optical means and said second optical means;
   (f) light detection means for detecting said major axis component and said minor axis component of the elliptically polarized light beam and for generating electric signals which represent the major and minor axis components of the elliptically polarized light beam, respectively; and
   (h) signal generating means for generating a signal representing the information recorded in the record medium by detecting a difference between said electric signals generated by said light receiving means.

2. An apparatus as claimed in claim 1, wherein:
said first optical means comprises a quarter wavelength plate oriented to have a principal axis thereof inclined by 45 degrees or −45 degrees with respect to the polarization direction of the linearly polarized light incident upon the record medium, said quarter wavelength plate introducing a phase difference of a quarter of a wavelength.

3. An apparatus as claimed in claim 2, wherein:
said rotation means rotates said light receiving means about said optical axis.

4. An apparatus as claimed in claim 3, wherein:
said second optical means comprises a polarization beam splitter for separating the major axis direction component and the minor axis direction component of the elliptically polarized light beam incident thereon from each other in orthogonal directions.

5. An apparatus as claimed in claim 3, wherein:
said second optical means comprises a polarization beam splitter having a polarization surface and a reflection surface to reflect a reflection light beam reflected by the polarization surface into a direction parallel with the direction of a transmission light beam transmitted through the polarization surface, and
said light receiving means comprises a photodetector having a pair of photo detecting areas arranged in the same plane to receive the transmission and reflection light beams emanating from the polarization beam splitter.

6. An apparatus as claimed in claim 5, wherein:
said rotation means comprises means for rotating said polarization beam splitter and said light receiving means integrally as a single device.

7. An apparatus as claimed in claim 3, wherein:
said second optical means comprises a Wollaston prism for separating the major axis component and the minor axis component of the elliptically polarized light beam incident thereon from each other directions which makes an acute angle, and
said light receiving means comprises a photodetector having a pair of photo detecting areas arranged in the same plane to receive the transmission and reflection light beams emanating from the Wollaston prism.

8. An apparatus as claimed in claim 7, wherein:
said rotation means comprises means for rotating said Wollaston prism and said light receiving means integrally as a single device.

9. An apparatus as claimed in claim 1, wherein said rotation means rotates said light detection means and said second optical means integrally as a single device.

* * * * *